US011221596B2

(12) United States Patent
Fisher et al.

(10) Patent No.: US 11,221,596 B2
(45) Date of Patent: Jan. 11, 2022

(54) HUB FOR MANAGING NETWORKED HOUSEHOLD APPLIANCES

(71) Applicant: ELECTROLUX HOME PRODUCTS, INC., Charlotte, NC (US)

(72) Inventors: James Fisher, Charlotte, NC (US); Giorgio Francescangeli, Cornelius, NC (US); Paul Stoufer, Charlotte, NC (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 1202 days.

(21) Appl. No.: 14/752,281

(22) Filed: Jun. 26, 2015

(65) Prior Publication Data
US 2016/0378082 A1    Dec. 29, 2016

(51) Int. Cl.
*G06F 15/173*    (2006.01)
*G05B 15/02*    (2006.01)
*H04L 12/28*    (2006.01)

(52) U.S. Cl.
CPC .......... *G05B 15/02* (2013.01); *H04L 12/2816* (2013.01); *G05B 2219/2642* (2013.01)

(58) Field of Classification Search
CPC ..... G05B 15/02; H04L 12/2816; H04L 12/28; H04W 84/12
See application file for complete search history.

(56) References Cited

U.S. PATENT DOCUMENTS

| 6,393,848 | B2 | 5/2002 | Roh et al. |
| 6,889,510 | B2 | 5/2005 | Song et al. |
| 7,032,018 | B2 | 4/2006 | Lee et al. |
| 7,090,141 | B2 | 8/2006 | Roh et al. |
| 7,136,940 | B2 | 11/2006 | Roh et al. |
| 7,162,517 | B2 | 1/2007 | Hallenbeck |
| 7,293,236 | B2 | 11/2007 | Choi et al. |
| 7,295,099 | B2 | 11/2007 | Lee et al. |
| 7,957,697 | B2 | 6/2011 | Park et al. |
| 8,079,225 | B2 | 12/2011 | Bauer et al. |

(Continued)

FOREIGN PATENT DOCUMENTS

| CN | 2710266 Y | 7/2005 |
| CN | 101202897 A | 6/2008 |

(Continued)

*Primary Examiner* — Cheikh T Ndiaye
(74) *Attorney, Agent, or Firm* — Womble Bond Dickinson (US) LLP

(57) ABSTRACT

A hub for managing networked household appliances is provided. The hub may include a network communication interface for wirelessly connecting to a wireless access point of a wireless local area network (WLAN), and a wireless repeater for receiving and rebroadcasting signals from the wireless access point. The hub may include an appliance communication interface for wirelessly connecting the hub to a plurality of household appliances and establish a wireless local appliance network over which the hub and the plurality of household appliances are configured to communicate with one another. The hub may also include a control module coupled to the appliance communication interface and configured to provide a user interface to enable a user to interact with the plurality of household appliances from the hub over the wireless local appliance network, and view status information associated with the household appliance.

20 Claims, 4 Drawing Sheets

(56) References Cited

U.S. PATENT DOCUMENTS

| | | |
|---|---|---|
| 8,271,116 B2 | 9/2012 | Lu |
| 8,295,990 B2 | 10/2012 | Venkatakrishnan et al. |
| 8,565,928 B2 | 10/2013 | Venkatakrishnan et al. |
| 8,621,097 B2 | 12/2013 | Venkatakrishnan et al. |
| 8,644,166 B2 | 2/2014 | Xia et al. |
| 9,172,553 B2 * | 10/2015 | Dawes ............... G06F 17/30873 |
| 2004/0054747 A1 | 3/2004 | Breh et al. |
| 2004/0162884 A1 | 8/2004 | Jeon |
| 2007/0242815 A1 | 10/2007 | Lee et al. |
| 2007/0290882 A1 | 12/2007 | Consorte et al. |
| 2008/0218307 A1 | 9/2008 | Schoettle |
| 2009/0322550 A1 | 12/2009 | Yu |
| 2011/0202189 A1 | 8/2011 | Venkatakrishnan et al. |
| 2011/0202783 A1 | 8/2011 | Venkatakrishnan et al. |
| 2011/0276898 A1 * | 11/2011 | van der Flier .......... H04L 51/36 715/752 |
| 2012/0063334 A1 * | 3/2012 | Drake ....................... G06F 1/32 370/252 |
| 2012/0109395 A1 | 5/2012 | Finch et al. |
| 2012/0154128 A1 | 6/2012 | Cho et al. |
| 2013/0073690 A1 * | 3/2013 | DeSalvo ................. H04L 67/12 709/219 |
| 2014/0314062 A1 * | 10/2014 | Loebs ................. H04L 12/2803 370/338 |
| 2016/0139575 A1 * | 5/2016 | Funes ................. H04L 12/2834 700/275 |
| 2016/0165663 A1 * | 6/2016 | Shanmugam ......... H04W 84/12 370/338 |

FOREIGN PATENT DOCUMENTS

| | | |
|---|---|---|
| CN | 201708814 A | 1/2011 |
| CN | 201804249 U | 4/2011 |
| CN | 102064984 A | 5/2011 |
| CN | 201909990 U | 7/2011 |
| CN | 201974674 U | 9/2011 |
| CN | 103019116 A | 4/2013 |
| KR | 100393637 | 8/2003 |
| WO | 2011153664 A1 | 12/2011 |

* cited by examiner

HUB FOR MANAGING NETWORKED HOUSEHOLD APPLIANCES

TECHNOLOGICAL FIELD

The present disclosure relates generally to household appliances and, in particular, to a hub for managing networked household appliances.

BACKGROUND

In recent years, there has been rapid advancement in low-cost home networking solutions as well as increasing consumer sophistication in deploying and maintaining home local area networks (LANs), such as wireless LANs (WLANs). As a result, home LANs are now ubiquitous and an increasing number of consumer products now offer networking capability supporting connectivity to a home LAN. Progress also continues to be made toward the conceptual "connected home" in which a multitude of consumer devices within a home are interconnected via a network for purposes of information sharing and automation among multiple devices in a home. For example, many household appliances now offer network connectivity supporting connectivity to a home LAN as well as communication with devices outside the home LAN via a wider area network such as the Internet. Currently appliance connectivity to a home LAN may require a physical connection to a network gateway device (e.g., a router) within the home such as via an Ethernet cable. In some instances, the appliance may be distantly located to the router thereby constraining such a connection. Therefore, a need exist for a hub for wirelessly managing networked household appliances.

BRIEF SUMMARY

Example implementations of the present disclosure provide improved apparatuses and methods for provisioning an appliance for network connectivity. The present disclosure includes, without limitation, the following example implementations:

Example Implementation 1: A hub for managing networked household appliances, the hub comprising a network communication interface configured to connect the hub to a wireless access point of a wireless local area network (WLAN), and a wireless repeater configured to receive and rebroadcast signals from the wireless access point. The hub further comprising an appliance communication interface configured to wirelessly connect the hub to a plurality of household appliances and thereby establish a wireless local appliance network over which the hub and the plurality of household appliances are configured to communicate with one another, and a control module coupled to the appliance communication interface and configured to provide a user interface to enable a user to interact with the plurality of household appliances from the hub over the wireless local appliance network, and for each household appliance of the plurality of household appliances, view status information associated with the household appliance.

Example Implementation 2: The hub of the preceding or subsequent example implementation, or combinations thereof, wherein the wireless repeater is configured to establish a second WLAN by the rebroadcast of signals from the wireless access point, one or more stations separate and distinct from the plurality of household appliances being wirelessly connectable to the wireless repeater for communication over the second WLAN.

Example Implementation 3: The hub of any preceding or subsequent example implementation, or combinations thereof, wherein the control module is further coupled to the network communication interface to further enable the plurality of household appliances to wirelessly connect to the wireless access point via the hub.

Example Implementation 4: The hub of any preceding or subsequent example implementation, or combinations thereof, wherein the control module being configured to provide the user interface includes for a household appliance of the plurality of household appliances, the control module being configured to receive user input to request and correspondingly interact with the household appliance to effect an operation or update a setting of the household appliance.

Example Implementation 5: The hub of any preceding or subsequent example implementation, or combinations thereof, wherein the control module being configured to provide the user interface includes for a household appliance of the plurality of household appliances, the control module being configured to receive user input to request and correspondingly interact with the household appliance to update a setting of the household appliance whereby the update is synchronized with at least one other household appliance of the plurality of household appliances.

Example Implementation 6: The hub of any preceding or subsequent example implementation, or combinations thereof, wherein the control module being configured to provide the user interface to enable the user to view status information includes being configured to produce a graph of the status information associated with the household appliance, the graph being an energy usage graph, appliance temperature graph, or graphical cycle progression chart.

Example Implementation 7: The hub of any preceding or subsequent example implementation, or combinations thereof, wherein the control module is further configured to monitor a status of each household appliance of the plurality of household appliances, and wherein the control module is configured to diagnose an error associated with a household appliance of the plurality of household appliances based at least in part on the status of the household appliance, and automatically alert the user of the error via the user interface.

Example Implementation 8: The hub of any preceding or subsequent example implementation, or combinations thereof, wherein the control module is further configured to perform at least one operation that corresponds to an operation of a household appliance of the plurality of household appliances, the at least one operation including a clock function, radio function, weather information service, thermostat function, measurement function, or timer function.

Example Implementation 9: The hub of any preceding or subsequent example implementation, or combinations thereof, further comprising a display configured to present the user interface.

Example Implementation 10: The hub of any preceding or subsequent example implementation, or combinations thereof, integrated into a stand-alone household appliance separate and distinct from the plurality of household appliances, the appliance communication interface being configured to wirelessly connect the stand-alone household appliance to the plurality of household appliances and thereby establish the wireless local appliance network over which the stand-alone household appliance and the plurality of household appliances are configured to communicate with one another.

Example Implementation 11: A method for managing a plurality household appliances via a hub, such a method comprising, at the hub, connecting the hub to a wireless access point of a wireless local area network (WLAN), receiving and rebroadcast signals from the wireless access point via a wireless repeater of the hub, wirelessly connecting the hub to the plurality of household appliances and thereby establishing a wireless local appliance network over which the hub and the plurality of household appliances communicate with one another, and providing a user interface to enable a user to interact with the plurality of household appliances from the hub over the wireless local appliance network, and for each household appliance of the plurality of household appliances, view status information associated with the household appliance.

Example Implementation 12: The method of the preceding or subsequent example implementation, or combinations thereof, further comprising establishing a second WLAN by the rebroadcast of signals from the wireless access point, one or more stations separate and distinct from the plurality of household appliances being wirelessly connectable to the wireless repeater for communication over the second WLAN.

Example Implementation 13: The method of any preceding or subsequent example implementation, or combinations thereof, further comprising wirelessly connecting the plurality of household appliances to the wireless access point via the hub.

Example Implementation 14: The method of any preceding or subsequent example implementation, or combinations thereof, wherein providing the user interface includes, for a household appliance of the plurality of household appliances, receiving user input to request and correspondingly interact with the household appliance to effect an operation or update a setting of the household appliance.

Example Implementation 15: The method of any preceding or subsequent example implementation, or combinations thereof, wherein providing the user interface includes, for a household appliance of the plurality of household appliances, receiving user input to request and correspondingly interacting with the household appliance to update a setting of the household appliance whereby the update is synchronized with at least one other household appliance of the plurality of household appliances.

Example Implementation 16: The method of any preceding or subsequent example implementation, or combinations thereof, wherein providing the user interface to enable the user to view status information includes producing a graph of the status information associated with the household appliance, the graph being an energy usage graph, appliance temperature graph, or graphical cycle progression chart.

Example Implementation 17: The method of any preceding or subsequent example implementation, or combinations thereof, further comprising, at the hub, monitoring a status of each household appliance of the plurality of household appliances, diagnosing an error associated with a household appliance of the plurality of household appliances based at least in part on the status of the household appliance, and automatically alerting the user of the error via the user interface.

Example Implementation 18: The method of any preceding or subsequent example implementation, or combinations thereof, further comprising, at the hub, performing at least one operation that corresponds to an operation of a household appliance of the plurality of household appliances, the at least one operation including a clock function, radio function, weather information service, thermostat function, measurement function, or timer function.

Example Implementation 19: The method of any preceding or subsequent example implementation, or combinations thereof, further comprising at the hub, presenting the user interface.

Example Implementation 20: The method of any preceding or subsequent example implementation, or combinations thereof, wherein the hub is integrated into a stand-alone household appliance separate and distinct from the plurality of household appliances, and wherein the method further comprises wirelessly connecting the stand-alone household appliance to the plurality of household appliances and thereby establish the wireless local appliance network over which the stand-alone household appliance and the plurality of household appliances communicate with one another.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will therefore be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
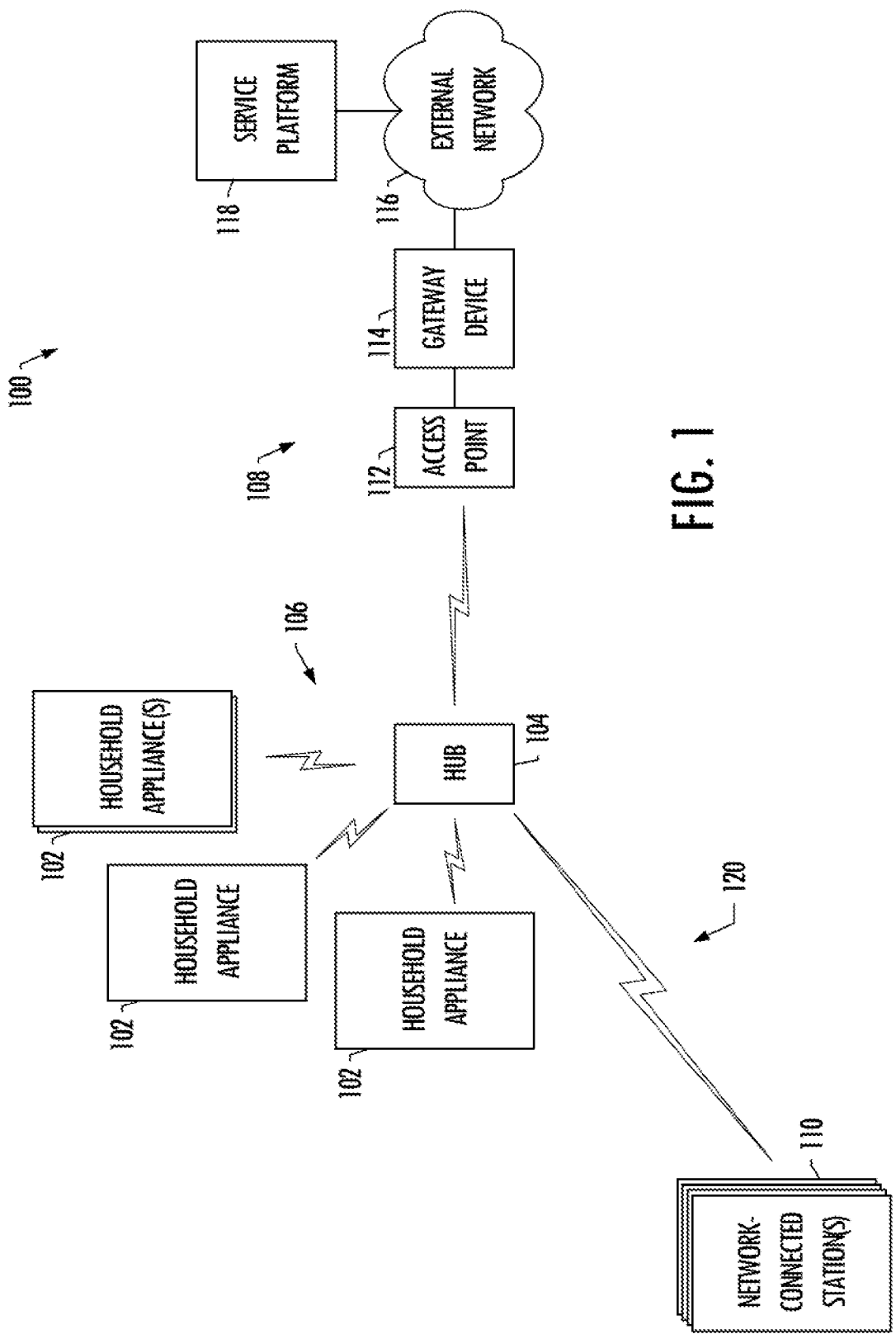
FIG. 1 is an illustration of a system for managing networked household appliances according to various example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

FIG. 1 illustrates a system 100 for managing a plurality of household appliances 102 according to various example implementations of the present disclosure. The system of example implementations may be suitable for any of a number of different types of household appliances, such as any of a number of different types of major appliances (white goods), small appliances and the like. Examples of suitable household appliances include dishwashers, washing machines, clothes dryers, refrigerators, freezers, ovens, ranges, cooktops, microwave ovens, trash compactors, air conditioners, water heaters or the like.

According to example implementations, the household appliances 102 may be provisioned for connectivity to a hub 104. The hub may be embodied as any computing device configured to establish a wireless local appliance network 106 over which the hub may wirelessly interface with the household appliances. The hub may also be configured to access a local area network (LAN). As shown, the LAN may be or include a wireless LAN (WLAN) 108 and may therefore be simply referred to as such herein; but it should be understood that the LAN may also include a wired LAN. By way of non-limiting example, the hub may be embodied as a universal serial bus (USB) hub, an Ethernet hub, an active hub, a passive hub, a network hub, a repeater hub, a multiport repeater hub or the like. The hub may also be embodied by non-traditional hub-specific hardware such as a personal computer (e.g., desktop computer, laptop computer), a mobile computing device (e.g., smart phone, tablet computer, digital camera) or the like.

The hub 104 may be configured to use any of a variety of wired or wireless (shown) network access technologies to access the WLAN 108. Examples of suitable wireless communication technologies include a LAN implementing one or more IEEE 802.11 standards (e.g., Wi-Fi) including peer-to-peer Wi-Fi protocols (e.g., Wi-Fi direct) and structures LAN protocols, Bluetooth, Zigbee, wireless universal serial bus (USB), and/or other wireless communication technologies not explicitly set forth herein. Examples of suitable wired communication technologies include a wired LAN implementing one or more IEEE 802.3 standards, and/or other wired communication technologies not explicitly set forth herein. In some example implementations, the hub may be configured to extend the range of the WLAN thereby establishing a second WLAN 120 over which one or more network-connected stations 110 may communicate with the hub.

The hub 104 may also use any of a variety of wireless communication technologies to interface with the household appliances 102. According to example implementations, the household appliances may also be provisioned for connectivity to the hub, and in some examples for connectivity to the WLAN 108 through the hub. The provisioning process in one example implementation may include the hub 104 being configured to operate as a WLAN station connected to the access point 112 of the WLAN 108. One example of a suitable provisioning technique is Wi-Fi Protected Setup (WPS) in which the household appliances may be provisioned with credentials of the hub. Examples of suitable credentials include a service set identifier (SSID) that identifies the hub, and if configured, a password for user authentication to gain access to the hub.

The WLAN 108 may include appropriate networking hardware, some of which may be integral and others of which may be separate and interconnected. As shown, for example, the WLAN may include a wireless access point 112 configured to permit wireless devices including the hub 104 to connect to the WLAN. As also shown, for example, the WLAN may include a gateway device 114 such as a residential gateway configured to connect the WLAN to an external network 116 such as a wide area network (WAN) like the Internet. In some examples, the wireless access point or gateway device may include an integrated router to which other systems or devices may be connected. The WLAN may also include other integral or separate and connected networking hardware, such as a network switch, hub, digital subscriber line (DSL) modem, cable modem or the like.

In some examples, the system 100 may further include a service platform 118, which may be embodied as a computer system accessible by the WLAN 108, directly or more typically through an external network 116. The service platform may include one or more servers, such as may be provided by one or more blade servers, a cloud computing infrastructure or the like. In some examples, the service platform may be embodied as a distributed computing apparatus including multiple computing devices, such as may be used to provide a cloud computing infrastructure. And in these examples, the computing devices that form the service platform may be in communication with each other via a network such as the external network.

The service platform 118 may be configured to provide one or more services to the household appliances 102 and perhaps other network-connected appliances and/or stations. In some examples, the service platform may be provided or maintained by or at the direction of a manufacturer of a household appliance, a vendor of a household appliance or another entity that may have an interest in the manufacture, distribution or maintenance of a household appliance. In one example implementations, an entity such as a manufacturer of household appliances may provide or direct another to provide a service platform that enables a user to access and use various features, such as features for management of a household appliance. Accordingly, a user may be able to remotely control one or more functionalities of a household appliance, monitor operation of a household appliance, initiate a service request for a household appliance, and/or perform other management tasks via the service platform.

In some examples, the service platform 118 may be accessible by or through the hub 104 over the WLAN 108 and external network 116. The hub may include or otherwise provide an installed application or other interface through which the service platform may be accessible. This application or other interface may be provided by a dedicated application installed on the hub. In another implementation, the application may be a mobile application, installed on a mobile device, from which the hub may be accessible. For example, the application or other interface may be or may be provided by a thin client and/or other client application, such as a mobile web browser application through which the hub and/or a web page (e.g., service portal) provided by the service platform may be accessible.

Figure 2A:
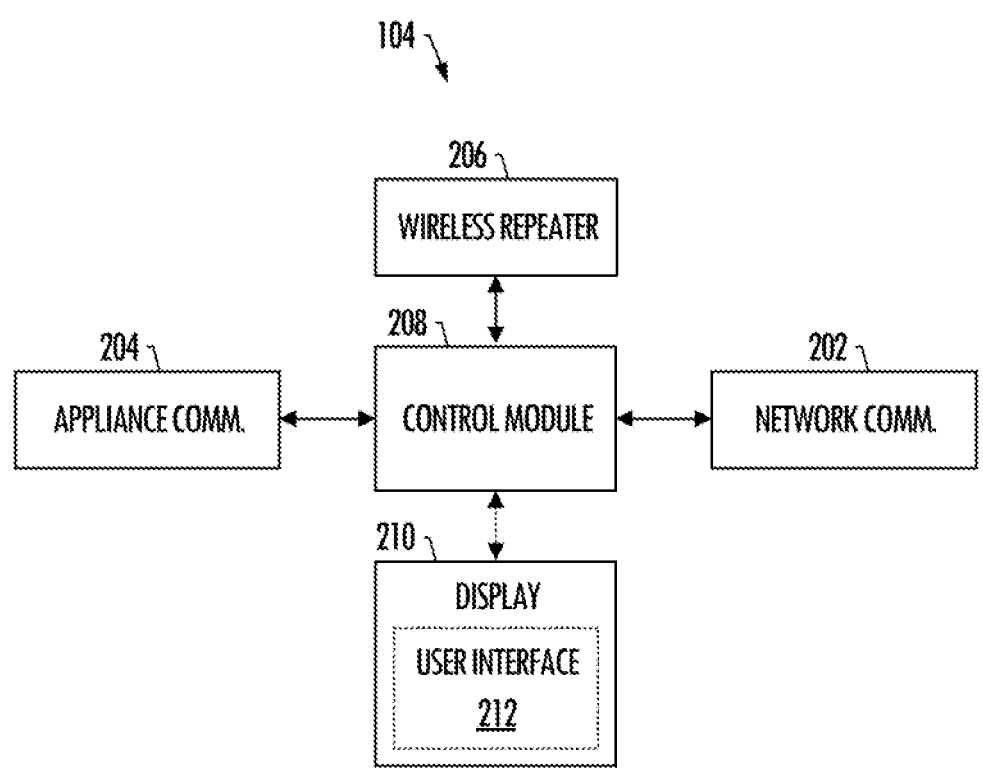
FIGS. 2A and 2B illustrate a hub for managing household appliances according to example implementations.
Figure 2B:
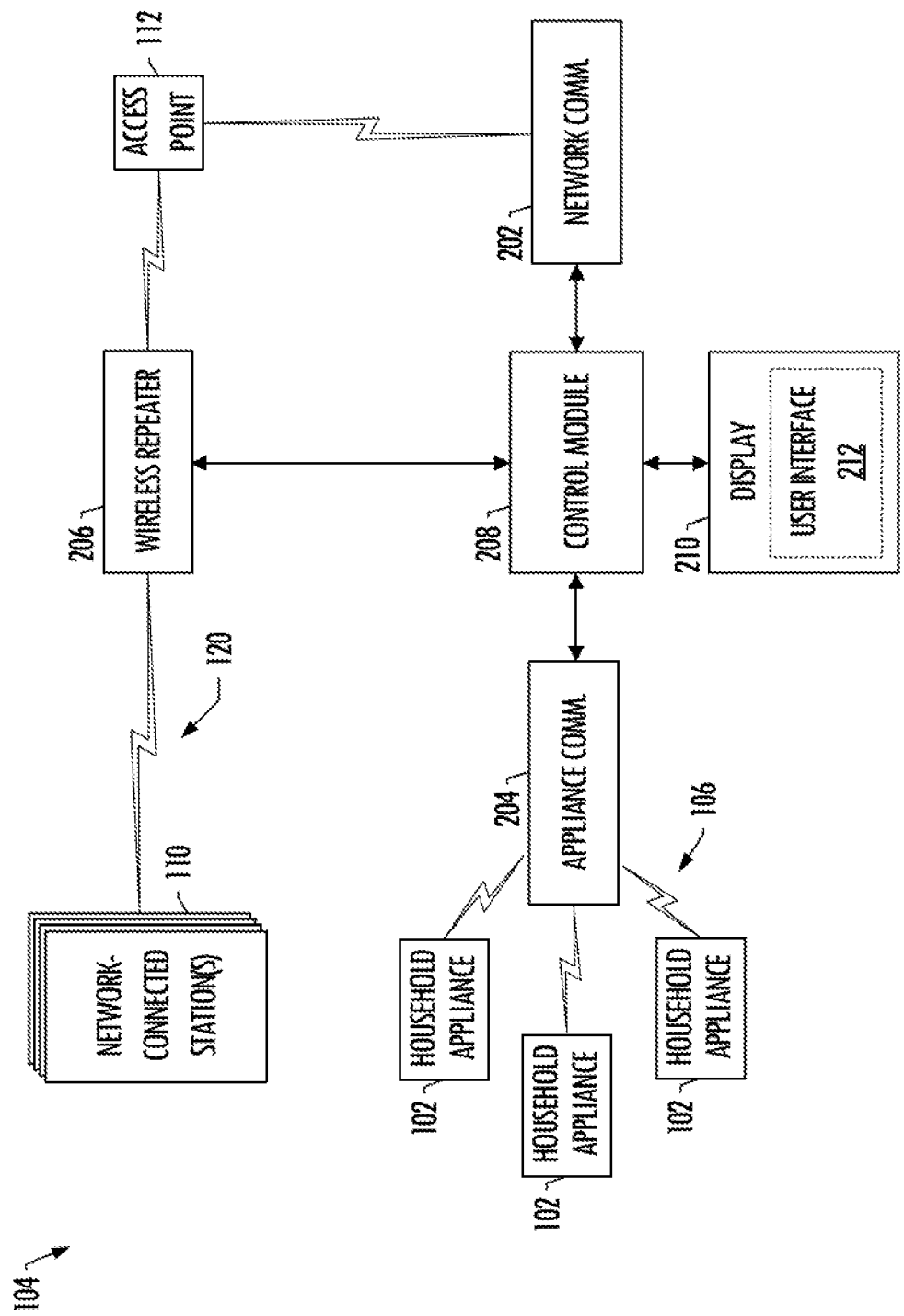

FIGS. 2A and 2B more particularly illustrate the hub 104 according to some example implementations. The hub may include one or more of each of any of a number of different components (each an individual physical component and/or subsystem) for performing one or more functions or operations to facilitate managing household appliances 102. As shown, for example, the hub may include a network communication interface 202, appliance communication interface 204, wireless repeater 206, control module 208 and display 210. It should be understood that while the network communication interface, appliance communication interface, wireless repeater, control module, and display are shown as part of the hub, one or more of the respective components may instead be separate from but in communication with the hub or even the access point 112. Further, it should be understood that one or more of the components may function or operate as a separate system without regard to others of the components. And it should be understood that the hub may include one or more additional or alternative components than those shown in FIGS. 2A and 2B.

As explained in greater detail below, the network communication interface 202 may be generally configured to connect the hub 104 to the wireless access point 112 of the WLAN 108. The appliance communication interface 204 may be generally configured to wirelessly connect the hub to the household appliances 102 and thereby establish the wireless local appliance network (e.g., local appliance network 106) over which the hub and the plurality of household appliances are configured to communicate with one another. The wireless repeater 206 may be generally configured to receive and rebroadcast signals from the wireless access point. The control module 208 may be generally configured to provide a user interface 212, which may be presented by the display 210, and enable a user to interact with the household appliances from the hub over the wireless local appliance network, and for each household appliance of the plurality of household appliances, view status information associated with the household appliance.

As previously indicated, the network communication interface 202 may be generally configured to connect the hub 104 to the wireless access point 112 of the WLAN 108. In some examples, the network communication interface 202 may be configured to transmit and/or receive information, such as to and/or from other apparatus(es), network(s) or the like. The network communication interface may be configured to transmit and/or receive information by physical (wired) and/or wireless communications links. Examples of suitable network communication interfaces include a network interface controller (NIC), wireless NIC (WNIC) or the like.

The network communication interface 202 may be coupled (either directly or indirectly) to the appliance communication interface 204, wireless repeater 206, and/or the control module 208. The network communication interface may enable the hub 104 to function as a WLAN station configured to access the wireless access point 112 and effectively serve as a gateway between the WLAN and the plurality of household appliances 102. As such, the hub may enable communication between the household appliances and the external network 116 by interfacing with the wireless access point. For example, the network communication interface may interface with the wireless access point to extend the external network to the hub, and from the hub to the plurality of household appliances.

Similar to the network communication interface 202, the appliance communication interface 204 may be configured to transmit and/or receive information, such as to and/or from household appliances, other network(s) or the like. The appliance communication interface may be configured to transmit and/or receive information by physical (wired) and/or wireless communications links. The appliance communication interface 204 may be configured to wirelessly connect to the plurality of household appliances 102. As such, the appliance communication interface may establish the wireless local appliance network 106 over which the hub and the plurality of household appliances communicate with one another. In some example implementations, the appliance communication interface may function as an access point of the appliance-specific network to which the household appliances may connect.

In some example implementations, the hub 104 may be integrated into a stand-alone household appliance separate and distinct from the household appliances 102, in which the appliance communication interface 206 may be configured to wirelessly connect the stand-alone household appliance to the household appliances and thereby establish the wireless local appliance network 106 over which the stand-alone household appliance and the plurality of household appliances communicate with one another. For example, the hub may be integrated into a refrigerator in which the refrigerator may include a user interface such as a liquid-crystal display (LCD) or other flat panel display implemented on the refrigerator door. The refrigerator user interface may be used to access general functionality of the hub enabling the refrigerator to send and/or receive information to other household appliances.

The wireless repeater 206 may be configured to receive and rebroadcast signals from the wireless access point 112. As such, the wireless repeater may be coupled to the wireless access point either directly or via the network communication interface 202. The wireless repeater may be configured to establish a second WLAN 120 by the rebroadcast of signals from the wireless access point. In some example implementations, the wireless repeater may be or include at least two wireless routers in which the first router may be configured to receive a signal from the wireless access point, and transmit the signal to the second router. The second router may then be configured to boost the received signal and transmit the boosted signal such that the wireless repeater thereby establishes the second WLAN. One or more network-connected stations 110 separate and distinct from the plurality of household appliances may then be wirelessly connectable to the wireless repeater for communication over the second WLAN. As such, the hub 104 may function as a Wi-Fi range extender for the wireless access point. Examples of suitable networked-connected stations include non-appliance devices such as security cameras, security systems, gaming systems, user mobile devices and the like. In other examples, the network-connected stations may include appliance devices distinct from those connected to the wireless local appliance network 106.

The control module 208 may include one or more of each of a number of components such as, for example, a processor connected to a memory. The processor may generally be any piece of computer hardware that is capable of processing information such as, for example, data, computer-readable program code, instructions or the like (at times generally referred to as "computer programs," e.g., software, firmware, etc.), and/or other suitable electronic information. The processor may be composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor of the control module 208 may be a number of processors, a multi-processor core or some other type of processor, depending on the particular implementation. Further, the processor may be implemented using a number of heterogeneous processor systems in which a main processor is present with one or more secondary processors on a single chip. The processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

In some example implementations, the processor of the control module 208 may also be connected to one or more interfaces for transmitting, receiving, and/or displaying information. The interfaces may include the network communication interface 202, appliance communication interface 206, display 210, and/or one or more user input interfaces.

The memory of the control module 208 may generally be any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

The control module 208 may be configured to provide the user interface 212, which may be presented by the display 210 and enable a user to remotely interact with the plurality of household appliances 102 using the hub 104. The display may include and/or be operatively coupled with one or more user input interfaces through which the user may interact with the user interface. For example, the hub may comprise an integrated display such as a touchscreen liquid crystal display (LCD), a display with associated input buttons, and/or other user interface elements. The display may be configured to present or otherwise display information to a user via the user interface. Examples of suitable displays include an LCD, light-emitting diode display (LED), plasma display panel (PDP) or the like. The user input interfaces may be wired or wireless, and may be configured to receive information from a user, via the user interface, into the hub, such as for processing, storage and/or display. Examples of suitable user input interfaces include a microphone, image or video capture device, keyboard or keypad, joystick, touch-sensitive surface (separate from or integrated into a touchscreen), biometric sensor or the like. The user input interfaces may further include one or more interfaces for communicating with peripherals such as printers, scanners or the like. In some example implementations, the hub may not include a separate user interface, and may instead interact with one provided by the appliance.

For each household appliance 102 of the plurality of household appliances, the user interface 212 may enable the user to view status information associated with the household appliance. In some example implementations, the control module 208 may be configured to produce a graph of the status information associated with the household appliances for subsequent presentation on the user interface. The graph may be or include an energy usage graph, appliance temperature graph, graphical cycle progression chart, and/or another graph or graphical depiction of status information not explicitly set forth herein.

In some example implementations, the control module 208 may be configured to receive input from a user in which the input specifies a request to control an operation of at least one network connected appliance 102 or update a setting associated with the household appliance. Based at least in part on the received input, the control module may then correspondingly interact with the household appliance to effect an operation or update a setting of the household appliance. As such, the hub 104 may be a common device from which the user may remotely effect operation of, or update settings for, a plurality of household appliances. For example, a user may request to update the temperature setting of their refrigerator using the hub, in which the hub may be wirelessly connected to and/or interfacing with the refrigerator. In another example, the user may request to initiate and/or customize a cycle of operation for a laundry appliance of dishwasher using the hub.

In some example implementations, the control module 208 may be configured to receive input from a user in which the input specifies a request to simultaneously update a setting associated with a plurality of household appliances 102. Based at least in part on the received input, the control module may then be configured to interact with the household appliance to effect a settings update of the household appliances in which the update is synchronized with at least one other household appliance of the plurality of household appliances. For example, the user may request to synchronize the time setting of a plurality of household appliances such that the control module may interact with the household appliances to simultaneously push a time setting update to each of the plurality of household appliances. In some example implementations, the household appliances may be configured to automatically synchronize with a setting of the hub 104. For example, the household appliances may be configured to automatically synchronize their time with the time setting of the hub such that in response to altering the time setting of the hub, the time setting of the plurality of household appliances is automatically updated without a need for an explicit user request to update the time setting.

The control module 108 may be coupled to the appliance communication interface 204 to interface with the household appliances over the wireless local appliance network 106. As previously indicated, the wireless local appliance network may be established by the appliance communication interface such that the control module is configured to establish communication with the plurality of household appliances via the appliance communication interface. The control module may be coupled to the network communication interface 206 to further enable the plurality of household appliances 102 to wirelessly connect to the wireless access point 112 via the hub 104. Again, the network communication interface may enable the hub to function as a WLAN station to access the access point and effectively serve as a gateway between the WLAN 108 and the plurality of household appliances, and more specifically the local appliance network.

In some example implementations, the control module 208 may provide monitoring and error diagnosis of the plurality of appliances 102. The control module may be configured to monitor a status of each household appliance of the plurality of household appliances, Based at least in part on the monitored status of a household appliance, the control module may then diagnose an error associated with the household appliance. The control module may be further configured to automatically alert the user of the error via the user interface 210, For example, if a freezer door is left ajar, the user interface may display an alert and/or the hub 104 may sound an alarm. In another example, if a household appliance is not functioning properly, the hub may provide an alert via the user interface which details the error diagnosis of the household appliance.

In some example implementations, the hub 104 may provide and/or implement the functionality of various small kitchen appliances and/or consumer electronic devices. As such, the control module 104 may be configured to implement at least one operation that corresponds to an operation of a household appliance of the plurality of household appliances 102, the one or more network-connected stations (e.g., network-connected stations 110), and/or other consumer electronic devices not explicitly set forth herein. Examples of suitable operations which may be performed by the hub include clock functions, radio functions, weather information services, thermostat functions, measurement functions (e.g., a food scale), timer function (e.g., a kitchen timer), shopping list applications, and the like.

Figure 3:
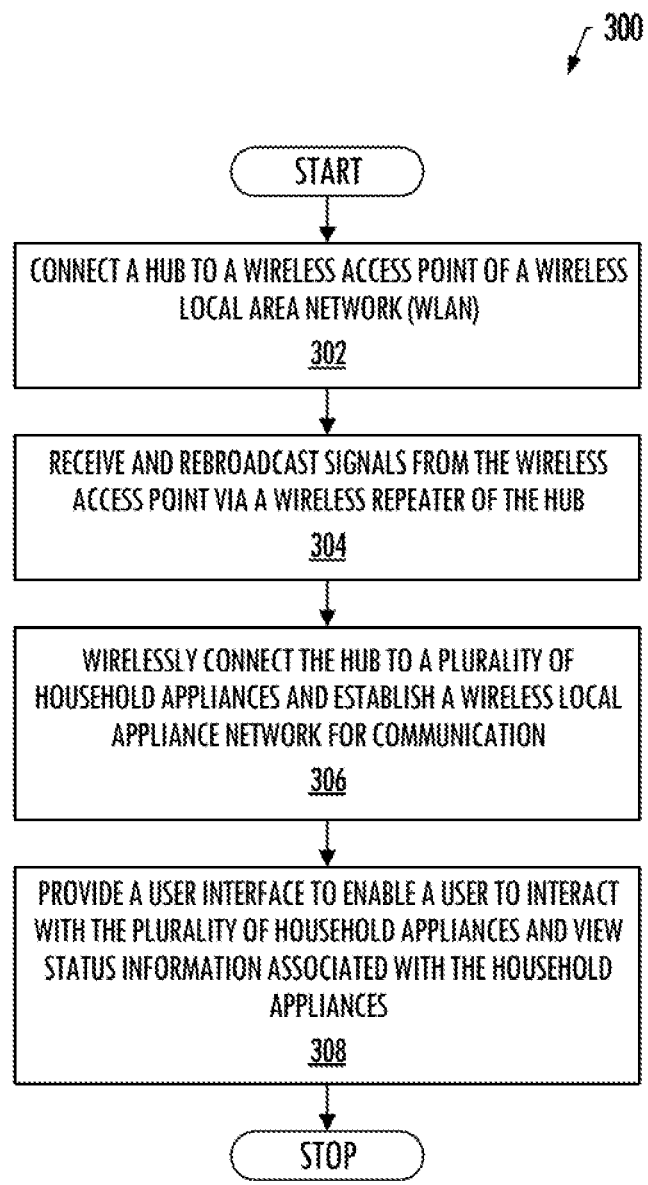
FIG. 3 is a flow diagram illustrating various operations in a method of providing a hub, in accordance with an example implementation.

FIG. 3 is a flowchart illustrating various steps in a method 300 of provisioning an appliance for network connectivity, according to some example implementations of the present disclosure. As shown at block 302, the method may include connecting a hub to a wireless access point of a wireless local area network (WLAN) and receiving and rebroadcast signals from the wireless access point via a wireless repeater of the hub, as shown at block 304.

As shown at block 306, the method may include wirelessly connecting the hub to a plurality of household appliances and thereby establishing a wireless local appliance network over which the hub and the plurality of household appliances are configured to communicate with one another. The method may also include, providing a user interface to enable a user to interact with the plurality of household appliances from the hub over the wireless local appliance network, and for each household appliance of the plurality of household appliances, view status information associated with the household appliance, as shown at block 308.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, the hub 104 may include a processor and a computer-readable storage medium or memory coupled to the processor, where the processor is configured to execute computer-readable program code stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A hub for managing networked household appliances, the hub comprising:
   a network communication interface configured to connect the hub to a wireless access point of a wireless local area network (WLAN);
   a wireless repeater configured to receive and rebroadcast signals from the wireless access point;
   an appliance communication interface configured to wirelessly connect the hub to a plurality of household appliances and thereby establish a wireless local appliance network over which the hub and the plurality of household appliances are configured to communicate with one another; and a control module coupled to the appliance communication interface and configured to provide a user interface to enable a user to interact with the plurality of household appliances from the hub over the wireless local appliance network, and for each household appliance of the plurality of household appliances, view status information associated with the household appliance.

2. The hub of claim 1, wherein the wireless repeater is configured to establish a second WLAN by the rebroadcast of signals from the wireless access point, one or more stations separate and distinct from the plurality of household appliances being wirelessly connectable to the wireless repeater for communication over the second WLAN.

3. The hub of claim 1, wherein the control module is further coupled to the network communication interface to further enable the plurality of household appliances to wirelessly connect to the wireless access point via the hub.

4. The hub of claim 1, wherein the control module being configured to provide the user interface includes for a household appliance of the plurality of household appliances, the control module being configured to receive user input to request and correspondingly interact with the household appliance to effect an operation or update a setting of the household appliance.

5. The hub of claim 1, wherein the control module being configured to provide the user interface includes for a household appliance of the plurality of household appliances, the control module being configured to receive user input to request and correspondingly interact with the household appliance to update a setting of the household appliance whereby the update is synchronized with at least one other household appliance of the plurality of household appliances.

6. The hub of claim 1, wherein the control module being configured to provide the user interface to enable the user to view status information includes being configured to produce a graph of the status information associated with the household appliance, the graph being an energy usage graph, appliance temperature graph, or graphical cycle progression chart.

7. The hub of claim 1 wherein the control module is further configured to monitor a status of each household appliance of the plurality of household appliances, and wherein the control module is configured to diagnose an error associated with a household appliance of the plurality of household appliances based at least in part on the status of the household appliance, and automatically alert the user of the error via the user interface.

8. The hub of claim 1 wherein the control module is further configured to perform at least one operation that corresponds to an operation of a household appliance of the plurality of household appliances, the at least one operation including a clock function, radio function, weather information service, thermostat function, measurement function, or timer function.

9. The hub of claim 1 further comprising a display configured to present the user interface.

10. The hub of claim 1 integrated into a stand-alone household appliance separate and distinct from the plurality of household appliances, the appliance communication interface being configured to wirelessly connect the stand-alone household appliance to the plurality of household appliances and thereby establish the wireless local appliance network over which the stand-alone household appliance and the plurality of household appliances are configured to communicate with one another.

11. A method for managing a plurality of household appliances via a hub, the method comprising at the hub:
  connecting the hub to a wireless access point of a wireless local area network (WLAN);
  receiving and rebroadcasting signals from the wireless access point via a wireless repeater of the hub;
  wirelessly connecting the hub to the plurality of household appliances and thereby establishing a wireless local appliance network over which the hub and the plurality of household appliances communicate with one another; and
  providing a user interface to enable a user to interact with the plurality of household appliances from the hub over the wireless local appliance network, and for each household appliance of the plurality of household appliances, view status information associated with the household appliance.

12. The method of claim 11 further comprising establishing a second WLAN by the rebroadcast of signals from the wireless access point, one or more stations separate and distinct from the plurality of household appliances being wirelessly connectable to the wireless repeater for communication over the second WLAN.

13. The method of claim 11 further comprising wirelessly connecting the plurality of household appliances to the wireless access point via the hub.

14. The method of claim 11, wherein providing the user interface includes, for a household appliance of the plurality of household appliances, receiving user input to request and correspondingly interact with the household appliance to effect an operation or update a setting of the household appliance.

15. The method of claim 11, wherein providing the user interface includes, for a household appliance of the plurality of household appliances, receiving user input to request and correspondingly interacting with the household appliance to update a setting of the household appliance whereby the update is synchronized with at least one other household appliance of the plurality of household appliances.

16. The method of claim 11, wherein providing the user interface to enable the user to view status information includes producing a graph of the status information associated with the household appliance, the graph being an energy usage graph, appliance temperature graph, or graphical cycle progression chart.

17. The method of claim 11 further comprising at the hub:
  monitoring a status of each household appliance of the plurality of household appliances;
  diagnosing an error associated with a household appliance of the plurality of household appliances based at least in part on the status of the household appliance; and
  automatically alerting the user of the error via the user interface.

18. The method of claim 11 further comprising at the hub, performing at least one operation that corresponds to an operation of a household appliance of the plurality of household appliances, the at least one operation including a clock function, radio function, weather information service, thermostat function, measurement function, or timer function.

19. The method of claim 11 further comprising at the hub, presenting the user interface.

20. The method of claim 11, wherein the hub is integrated into a stand-alone household appliance separate and distinct from the plurality of household appliances, and
  wherein the method further comprises wirelessly connecting the stand-alone household appliance to the plurality of household appliances and thereby establish the wireless local appliance network over which the stand-alone household appliance and the plurality of household appliances communicate with one another.

* * * * *